(12) United States Patent
Yamagami et al.

(10) Patent No.: US 6,398,641 B1
(45) Date of Patent: Jun. 4, 2002

(54) PUZZLE GAME APPARATUS AND STORAGE MEDIUM THEREFORE

(75) Inventors: Hitoshi Yamagami; Kenichi Nakamura, both of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/506,573

(22) Filed: Feb. 18, 2000

(51) Int. Cl.⁷ ................................................ A63F 13/00
(52) U.S. Cl. .......................................... 463/9; 273/153
(58) Field of Search ............................. 463/1, 7, 9, 10, 463/23, 30, 43–47

(56) References Cited

U.S. PATENT DOCUMENTS

| | | | |
|---|---|---|---|
| 4,359,222 A | * 11/1982 | Smith et al. ................. | 273/85 |
| 5,577,185 A | * 11/1996 | Tunnell et al. ............... | 463/9 |
| 5,643,084 A | * 7/1997 | Mirsky ......................... | 463/9 |
| 5,643,085 A | * 7/1997 | Aityan et al. ................. | 463/9 |
| 5,992,849 A | * 11/1999 | Olti et al. ..................... | 463/9 |
| RE36,675 E | * 4/2000 | Yamamoto et al. .......... | 463/10 |
| 6,142,869 A | * 11/2000 | Meyer et al. ................. | 463/1 |

OTHER PUBLICATIONS

TubeRoid v2.01, Jaibo Software, Jun. 10, 1999.*
PipeBuster v0.1b, Artin, Oct. 5, 1999.*
BOXLINK, Tiger Electronics, 1997 Catalog.*

* cited by examiner

*Primary Examiner*—Jessica Harrison
*Assistant Examiner*—John M Hotaling, II
(74) *Attorney, Agent, or Firm*—Nixon & Vanderhye P.C.

(57) ABSTRACT

A puzzle game apparatus having an LCD. On the LCD is displayed a game field having square lattices arranged in a matrix. From an upper end of the game field is fallen a square slant-lined panel having two vertexes set as connection terminals. A game player is allowed to rotate or move the slant lined panel to connect a connection terminal of the panel to a connection terminal of an adjacent panel, thereby completing a bent lined figure continuing from a left end to a right end of the game field.

13 Claims, 14 Drawing Sheets

KIND OF SLANT-LINED PANEL

EMPTY PANEL  STRAIGHT-LINED PANEL  BENT-LINED PANEL

KIND OF SLANT-LINED PANEL

EMPTY PANEL     STRAIGHT-LINED PANEL     BENT-LINED PANEL

PANEL INDEX VALUE

PANEL TERMINAL NO.

RELATIVE POSITION OF ADJACENT PANEL

PUZZLE GAME APPARATUS AND STORAGE MEDIUM THEREFORE

BACKGROUND OF THE INVENTION

1. Field of the Invention

This invention relates generally to a puzzle game apparatus and storage medium for same. More particularly, the invention relates to a novel apparatus for a puzzle game wherein the object of the game is to complete a bent-line figure continuing from one end to the other end of a game field with using panels depicted with straight lines (slant lines) connecting between two vertexes of a square and a center thereof (hereinafter may be referred merely as "slant-lined panel), and to a storage medium recording program data for such a puzzle game and puzzle data.

2. Description of the Prior Art

Conventionally, there has been known a "water pipeline game" as a puzzle game in which a figure is to be completed by connecting lines. The "water pipeline game" uses panels having lines depicted to connect a midpoint of an arbitrary side of a square and a center thereof. In the actual game, the lines are represented in a manner that simulates water conduit. The panels include a straight-lined panel having a line connecting two opposed sides, an L-lined panel having lines connecting two adjacent sides, and a T-lined panel connecting three, sides of the square, and a cross-lined panel having lines connecting all four sides of the panel. The purpose of the "water pipeline game" is to arrange the panels within an arrangement space., Water is passed from a predetermined start point to and the goal of the game involves a competition for a greatest distance over which water flows through the constructed water pipeline.

In the water pipeline game, however, the panel has a connection point positioned in a side of the square such the only one panel can be connected to one connection point. This arrangement frequently causes missing of a connection, thus making it difficult to complete a route for waterflow. Furthermore in the water pipeline game, a branch of a route is given only by a T-lined or cross-lined panel, resulting in low branching flexibility and a resulting lack in game amusement.

There is also well known a similar panel-falling type of a puzzle game called Tetris. The purpose of this game basically is to compete for a score horizontally connecting panels in one line in a game field. This game is also deficient in variation, like the water pipeline game. Furthermore, the panels are formed over a plurality of lattices and the panels are less free in rotation or movement.

SUMMARY OF THE INVENTION

Therefore, it is a primary object of the present invention to provide a novel puzzle game apparatus and storage medium for same.

Another object of the invention is to provide a puzzle game apparatus using novel slant-lined panels, and a storage medium for same.

A further object of the invention is to provide a puzzle game apparatus which is high in freedom and improved in game amusement, and a storage medium for same.

A puzzle game apparatus according to the present invention includes: an operating member to be operated by a game player; a display for displaying a game field having a plurality of lattices arranged in a matrix form and having a first end and a second end; a panel thrower for throwing a panel depicted with a line connecting at least between two connection terminals into a game field displayed on the display: a panel shifter for causing a panel thrown in the game field to shift on the display according to operation of the operating members and a connection determiner for detecting whether or not a bent-lined figure continuing from the first end to the second end of the game field is formed by panels including the thrown panel.

Specifically, the panel is a square having four vertexes, the connection terminals being formed at two of the four vertexes, and the line being a straight line connecting between the two vertexes and a center of the square.

Preferably, the panel includes a straight lined panel having the straight line given as a diagonal line of the square and a bent-lined panel having the straight line given as a bent line connecting between two adjacent vertexes and the center of the panel.

When a panel is thrown in a game field, a game player is allowed to rotate and move the panel to complete a bent-lined figure continuing from one end to the other end of the game field. In one embodiment, a panel is thrown, by dropping the panel from above, into the game field. Consequently, the game player can move the panel to a position of an empty lattice in the game field and to complete a bent-lined figure. Also, the panel is formed with two connection terminals. Unless adjacent panels at connection terminals are connected with each other, the adjacent panels are not put in succession. Accordingly, the game player may rotate a panel so that the connection terminal can be aligned to a connection terminal of the adjacent panel.

According to the invention, the panel has connection terminals arranged. at vertexes of a square thereof. This enables three panels to be connected to one connection point, enhancing freedom of combination. Accordingly, a bent-lined figure is comparatively easy to complete, thus enhancing game amusement. Furthermore, in the invention a route can be branched without using a branch panel, such as a cross panel, thereby avoiding complexity for a game.

A preferred embodiment of the invention includes a success display to represent a success when on display when the bent lined figure is detected by the connection determiner. This success display includes, as an example, a panel eraser for erasing a panel involved in completing the bent lined figure.

The connection determiner includes an includes adjacent panel detector for detecting whether or not there is an adjacent panel adjacent to each panel displayed on the display, connection detecting means to detect whether or not the adjacent panels at a connection terminals thereof are connected with each other, and a succession detector for detecting whether or not two or more adjacent panels are connected in a successive form.

A bent lined figure to be completed in the puzzle game of the invention has a plurality of connection patterns different from each other, and the scoring system enters a different score for each different connection pattern.

A storage medium according to the invention includes: a first generator for generating game field data to display on a display a game field having a plurality of lattices arranged in a matrix; second, generator means for generating panel data to display a panel depicted with a line connecting between at least two connection terminals; a throw program for throwing into the game field a panel of panel data generated by the second generator; panel shift program for shifting a panel thrown into the game field; and a connection determining program means for determining whether or not a bent lined figure is formed which continues from one end to the other end of the game field on the display.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
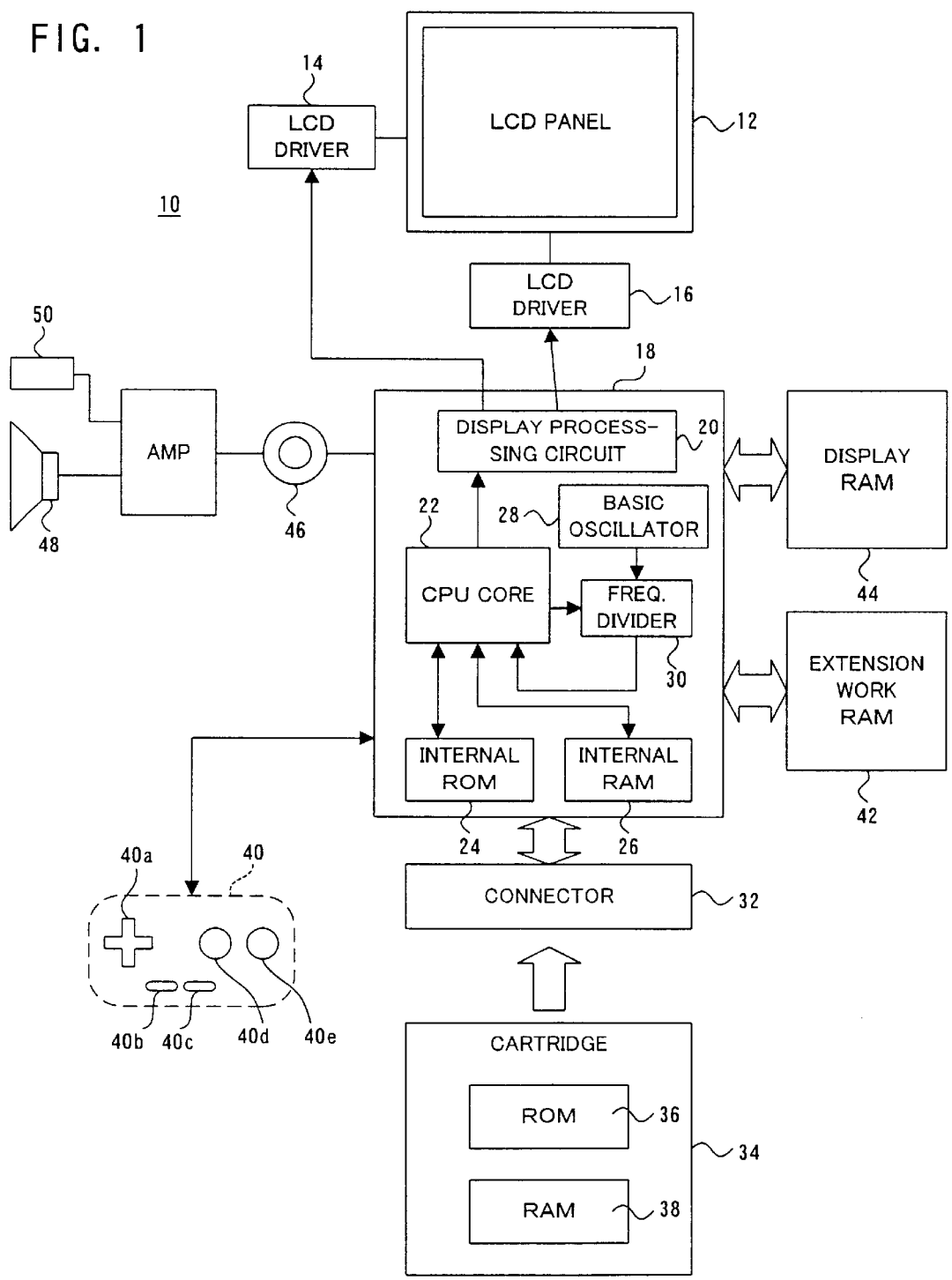
FIG. 1 is a block diagram showing one embodiment of the present invention.

Referring to FIG. 1, a portable color display game machine 10 as one example of a game apparatus on which a puzzle game of the invention can be played includes a color LCD 12. This color LCD 12 is structured as a dot matrix display. The color LCD 12 is driven by LCD drivers 14 and 16 to display a color picture on a screen thereof. The LCD driver 14 drives, for example, selectively a row of a dot matrix while the LCD driver 16 drives, for example, selectively a column thereof. These LCD drivers 14 and 16 are supplied color picture signals from a color display processing circuit 20 included in a CPU 18.

The CPU 18 further includes a CPU core 22. The CPU core 22 is coupled with an internal ROM 24 and internal RAM 26. The internal RAM 26 is utilized as a working memory for the CPU core 22 and has a storage area shown in FIG. 12.

The CPU 18 furthermore includes a basic oscillator 28. This basic oscillator 28 is configured, for example, by a quartz oscillator to supply an oscillation signal to a programmable frequency divider 30. This programmable frequency divider 30 performs frequency-division on an oscillation signal from the basic oscillator 28 according to frequency-dividing data given from the CPU core 22, and provides a frequency-divided signal as a clock for the CPU core 22.

Figure 11:
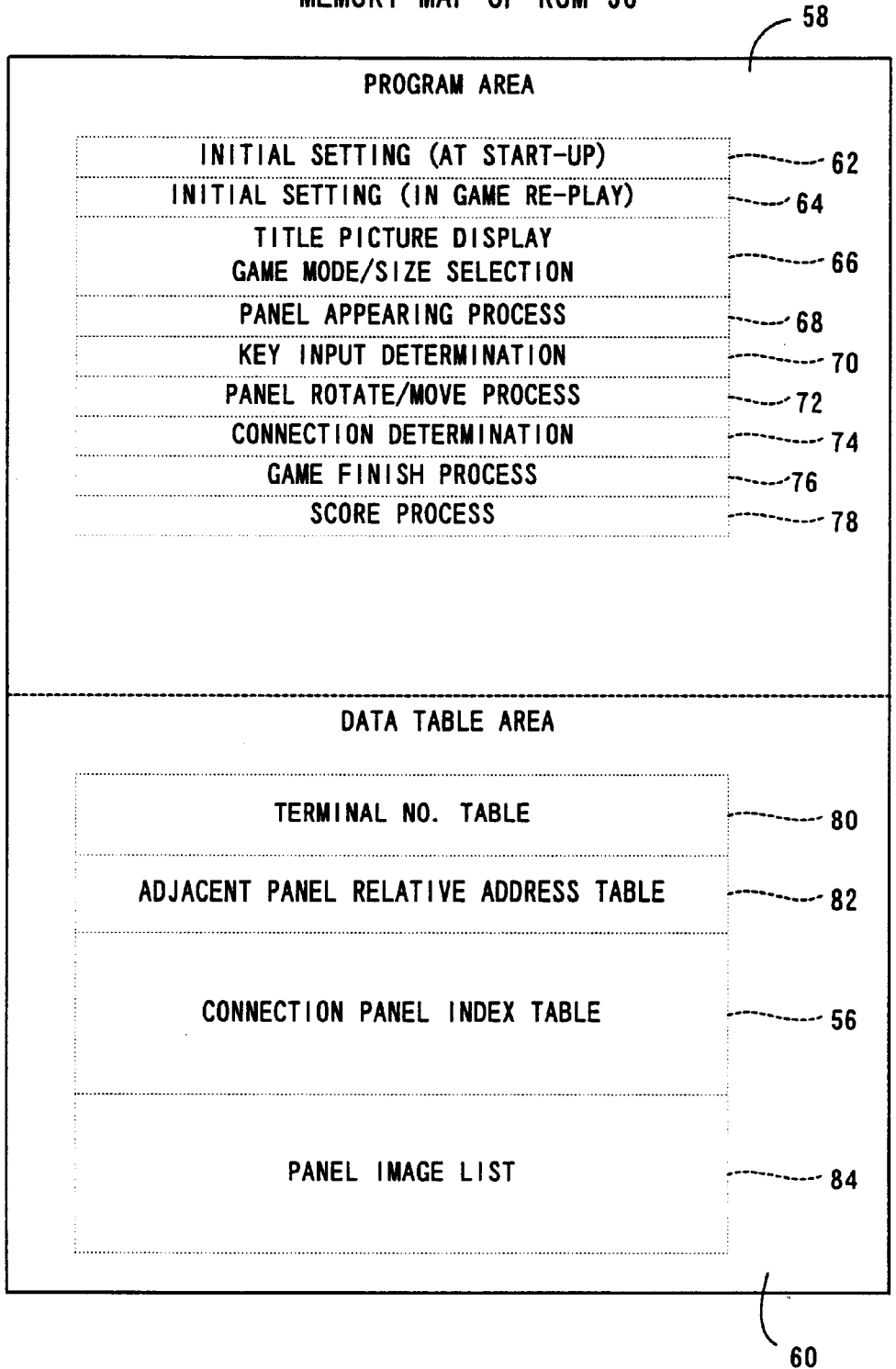
FIG. 11 is an illustrative view showing a memory map of an external ROM.

The CPU 18 is connected with a connector 32 through an appropriate bus. This connector 32 is to be loaded with a game cartridge 34 constituting a storage medium. The cartridge 34 includes an external ROM 36 and RAM 38. The external ROM 36 stores, as shown in FIG. 11, game programs and image data. The RAM 38 is used to store backup data for a game.

The CPU 18 is furthermore supplied with respective operation signals of operation keys 40a–40e. The operation key 40a is a cross key to instruct a moving direction of a panel (described later) being displayed on the color LCD 12. In the puzzle game of this embodiment, a panel automatically comes falling so that the player can move the panel only in an X direction (left-and-right directions). Accordingly, a right or left lever on the cross key 40a is used to move a panel. The operation key 40b is a select key used to select, for example, a game mode. The operation key 40c is a start key used to start playing a game or temporarily cease a game from proceeding. The operation keys 40d and 40e are push button switches. The push button switches 40d and 40e are utilized to instruct rotation of panel, described later. The switch 40d is to instruct, for example, clockwise rotation and the switch 40e is to instruct, for example, counterclockwise rotation. These operation keys 40a–40e are arranged on a front face of a main body of the game machine 10, as shown in FIG. 1. A key matrix (not shown) sends, as controller data, operation signals of the operation keys 40a–40e to the CPU 18.

Where using an ascending type panel wherein the panel soars up from below the game field 51 instead of the descending type to wherein a panel falls down from above of the game field 51, the panel is allowed to move not only in a left-and-right directions (X direction) but also in a vertical directions (Y direction). In such a case, an up-lever or down-lever on the cross key 40a is to be utilized in order to provide instructions for movement of the panel.

Figure 12:
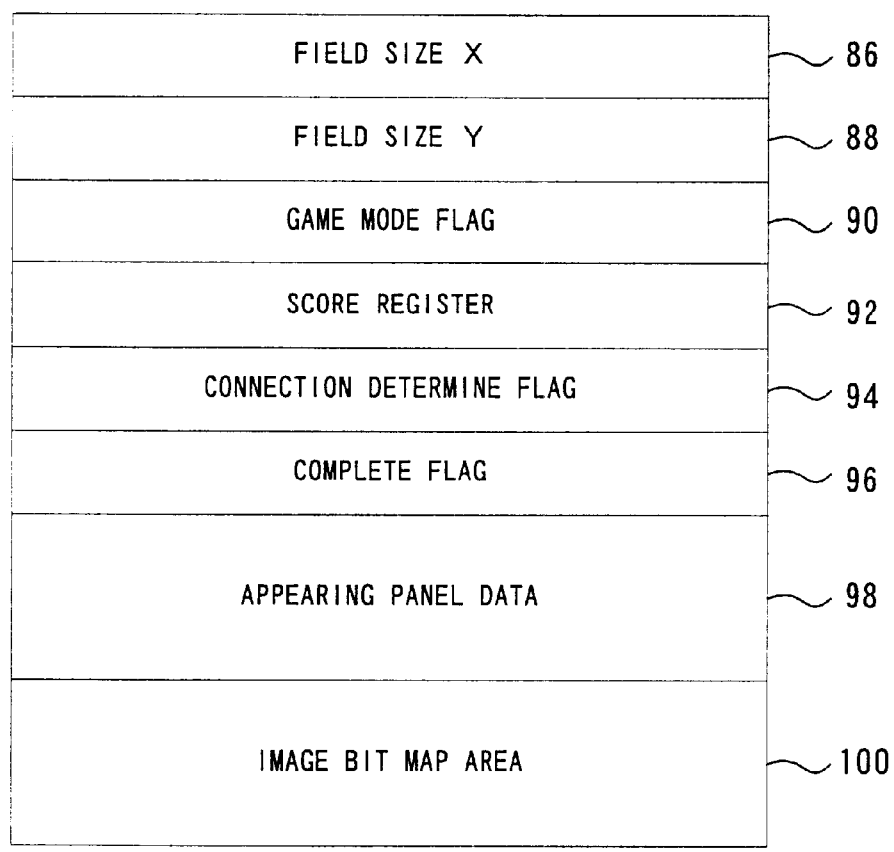
FIG. 12 is an illustrative view showing a memory map of a work RAM.

The CPU 18 performs data processing to write display data onto a display RAM 44 by using, as required, the extension RAM 42, according to a game program and panel data given from the cartridge 34 as well as to controller data from the operation keys 40a–40e. The extension RAM 42 may be utilized as a working memory in place of the internal RAM 26 to provide therein a storage area, as shown in FIG. 12.

As a result of data processing by the CPU 18, a sound signal to be outputted is adjusted in level by a volume control 46 and then outputted onto a speaker 48 and/or earphone jack 50. The output sound signal through the speaker 48 and/or earphone jack 50 includes game sound effects and music.

Figure 2:
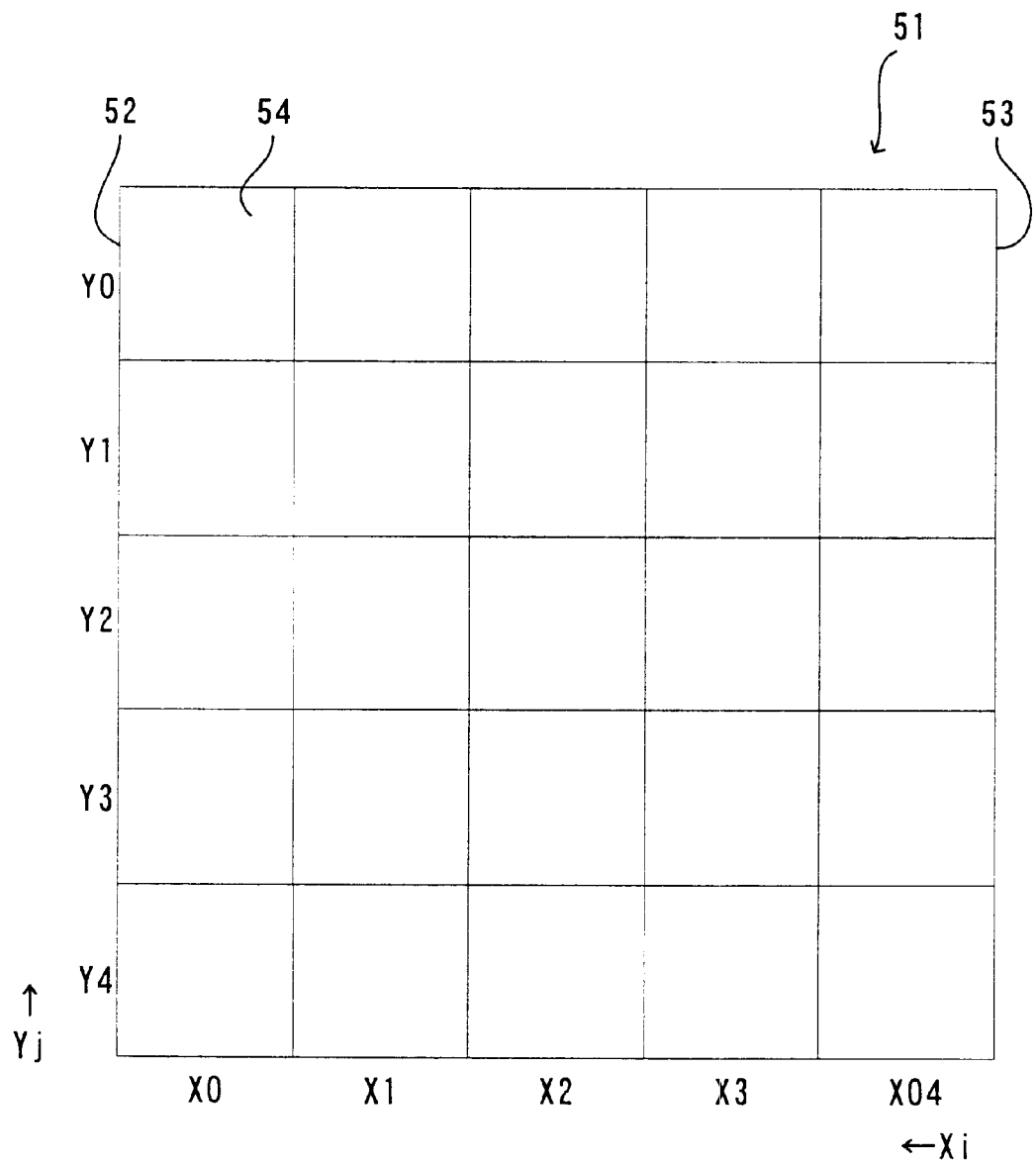
FIG. 2 is an illustrative view showing a game field for a puzzle game in one embodiment.
Figure 3:
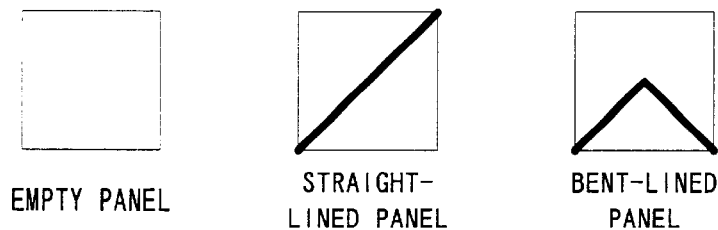
FIG. 3 is an illustrative view showing the kinds of panels that may be used in accordance with the invention.
Figure 4:
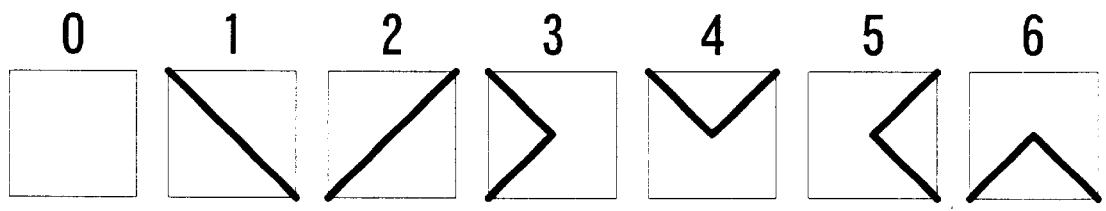
FIG. 4 is an illustrative view showing the kinds and the number of panels that may be used in accordance with the invention.

Brief explanation will be made herein on the puzzle game of the invention, prior to explaining the operation of the FIG. 1 embodiment in greater detail. On the LCD 12 of FIG. 1 is displayed a game field or panel arrangement space 51 as shown in FIG. 2. In this embodiment, the panel arrangement space 51 has 5 rows×5 columns of square lattices 54 arranged between a left end 52 and a right end 53. Panels, as shown in FIG. 3 and FIG. 4, are made to fall from a top end of each column in the panel arrangement space 51. The game player is allowed to manipulate the operation key 40 to rotate a falling panel or move it in the left-and-right directions (X direction), in order to finally complete a bent-lined figure continuing from the left end 52 to the right end 53 in the game field or panel arrangement space 51.

In the puzzle game of this embodiment, basically three kinds of panels are used which are as shown in FIG. 3. These panels are each in a square form having a size corresponding to one of the lattices 54 in the panel arrangement space of FIG. 2. A first kind of panel is an "empty panel" having no line, a second kind of panel is a "straight-lined panel" depicted with a diagonal line in the square, and a third kind panel is a "bent-lined panel" depicted with a line connecting between adjacent vertexes and a center.

There is only one kind of empty panel. However, the straight-lined panels includes two kinds of panels that are different in diagonal lines from each other, as shown in FIG. 4. The bent-lined panels, as shown in FIG. 4, include four kinds of panels which utilize different ones of adjacent vertexes from one another. As a consequence, 7 panels in 3 kinds are employed in the puzzle game of the present embodiment. The seven panels are previously assigned with respective panel index values as shown in FIG. 4, i.e. "0", "1", "2", "3", "4", "5" and "6". The panel having a panel index value "0" is an empty panel. The panel index value "1" or "2" refers to one of the straight-lined panels; while the panel index value "3", "4", "5" or "6" refers to one of the bent-lined panel. The panel index values are utilized in determining connectability or the like, as described later. As concerned with an empty panel, a state that neither of straight-lined nor bent-lined panels with a panel index value "1" to "6" is displayed in a lattice 54 is referred to as an "empty panel", for the sake of convenience. Accordingly, the present embodiment will explain a case where no empty panel is used. It is however needless to say that the empty panels may be used.

Figure 5:
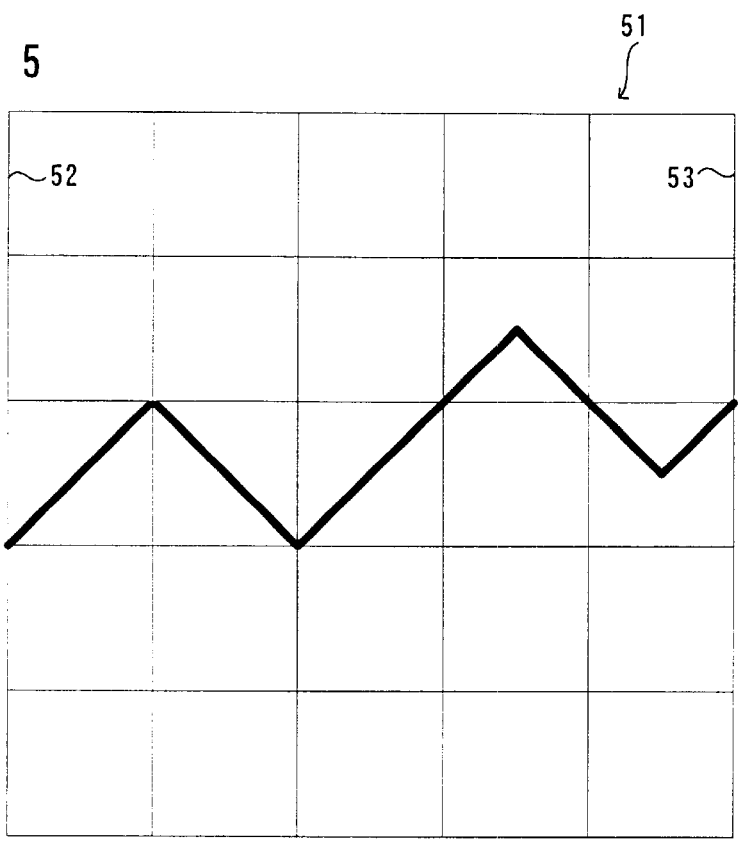
FIG. 5 is an illustrative view showing one example of a connection pattern as a basic connection.
Figure 6:
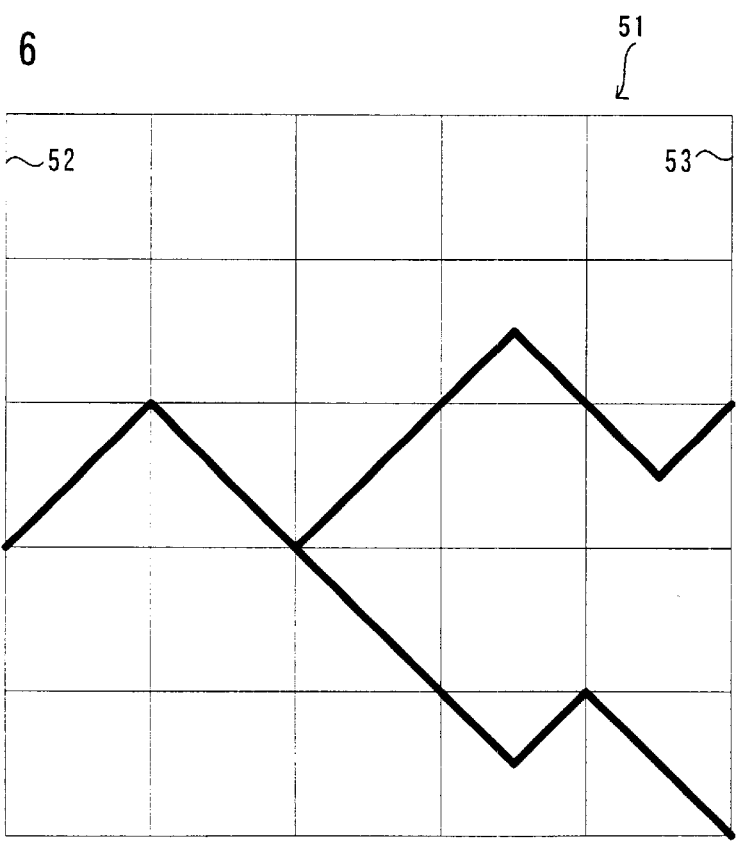
FIG. 6 is an illustrative view showing one example of a connection pattern as a branch connection.
Figure 7:
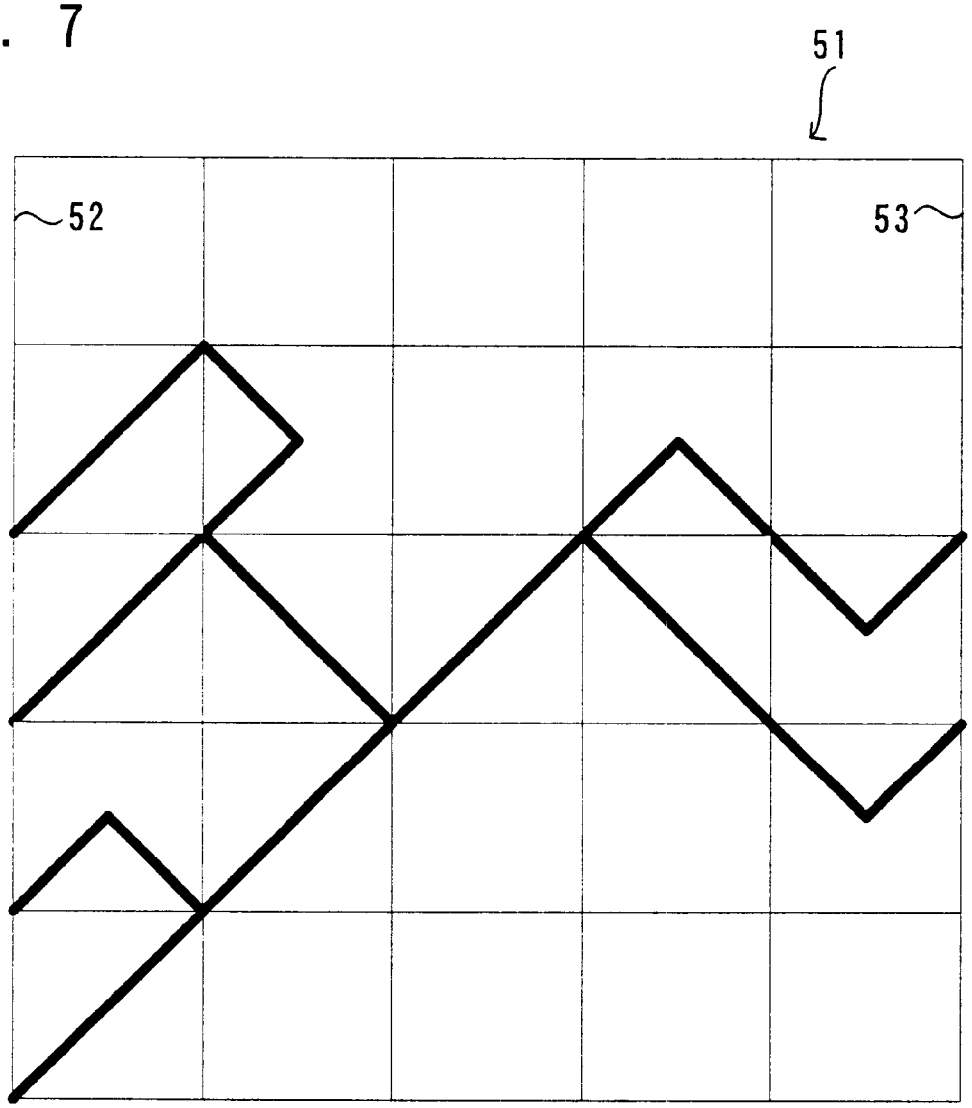
FIG. 7 is an illustrative view showing one example of a connection pattern as a zigzag connection.

FIG. 5 illustrates a complete figure called a "basic connection". The basic connection means a form of connection wherein only one bent line exists continuing from the left end 52 to right end 53. In contrast, a complete figure of FIG. 6 is called a "branch connection". The branch connection is a form of a connection having only one connection point at one of the left end 52 or right end 53 and two or more connection points at the other due to a midway branching. Furthermore, a completed figure of FIG. 7 is a "zigzag" connection. This zigzag connection is in a form of connection having two or more connection points at each of the left end 52 and right end 53. These figures or connection forms are taken into account in calculating a score, described later. That is, a lowest score is given for an easiest basic connection whereas a highest score is for a most difficult zigzag connection. A middle score is given for a branch connection which is in a middle level of difficulty.

Figure 8:
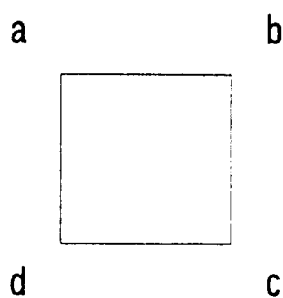
FIG. 8 is an illustrative view showing terminal nos. on the panel.

Each panel has terminal nos. a, b, c and d respectively set for four vertexes in a fixed way, as shown in FIG. 8. For example, the straight-lined panel having a panel index "1" of FIG. 4 is depicted with a straight line connecting between a vertex of terminal no. a and a vertex of terminal no. c. The bent-lined panel with "6" has a straight line connecting between a vertex of terminal no. c and a center as well as a straight line connecting between a vertex of terminal no. d and the center.

Figure 9:
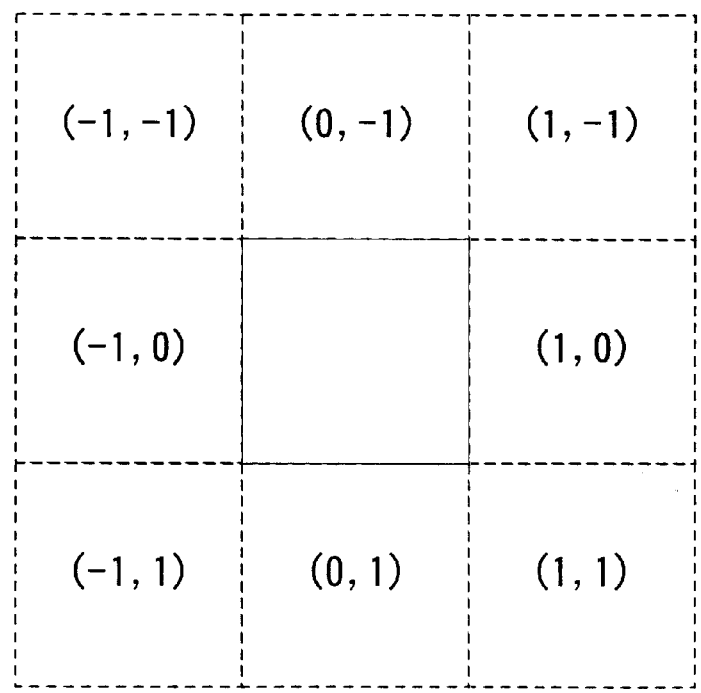
FIG. 9 is an illustrative view showing relative positions of adjacent panels.

It is possible to put a maximum of eight panels adjacent to a panel being considered, as shown in FIG. 9. The adjacent panels are respectively assigned with relative positional coordinates to the panel being considered located at a center in FIG. 9. More specifically, an adjacent panel positioned at the upper left of the panel being considered is given a relative coordinate (−1, −1), an adjacent panel positioned immediately left of the panel being considered is given a relative coordinate (−1, 0), and an adjacent panel positioned at the lower left of the panel being considered is given a relative coordinate (−1, 1).

Also, an adjacent panel immediately above the panel being considered is given a relative coordinate (0, −1), and an adjacent panel immediately below the panel being considered is given a relative coordinate (0, 1). An adjacent panel positioned at the upper right of the panel being considered is given a relative coordinate (1, −1), an adjacent panel positioned immediately right of the panel being considered is given a relative coordinate (1, 0), and an adjacent panel positioned at the lower right of the panel being considered is given a relative coordinate (1, 1).

In this manner, the present embodiment assigns the adjacent panel positioned left of the panel being considered with a relative coordinate X of (−1) and the adjacent panel positioned right thereof with a relative coordinate X of (1). The adjacent panel positioned above the panel being considered is given a relative coordinate Y of (−1) and the adjacent panel positioned below is given a relative coordinate Y of (1). The adjacent panel positioned left or right of the panel being considered is given (0) of a relative coordinate Y and the adjacent panel positioned above or below the panel being considered is given (0) of a relative coordinate X.

Figure 10:
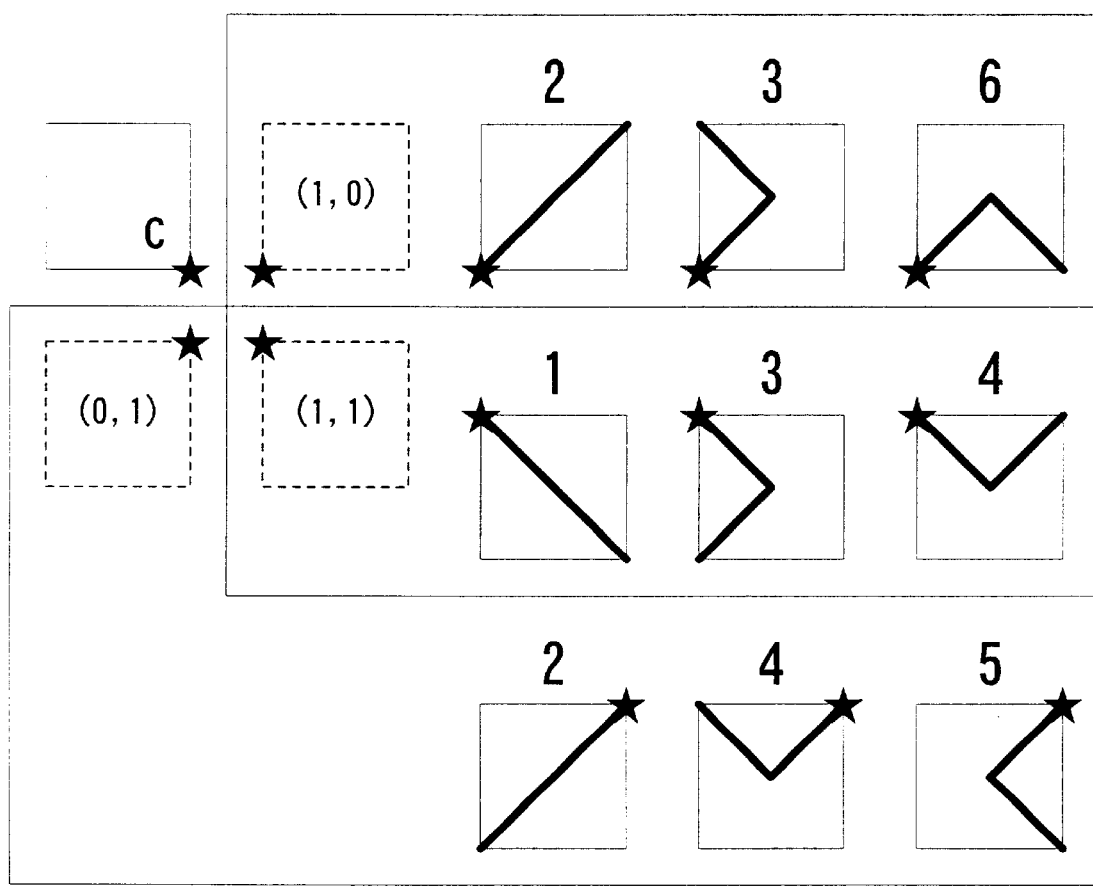
FIG. 10 is an illustrative view showing one example of a panel index value of a connectable adjacent panel to one terminal no. on one panel.

Using such relative positional coordinates for adjacent panels, is an adjacent panel to be connected is determined, as shown in FIG. 10. FIG. 10 shows, as an example, an adjacent panel to be connected to a terminal no. c of the panel being considered (panel at upper left in FIG. 10). For example, considering an adjacent panel at the immediately right to the panel being considered, i.e. an adjacent panel having a relative positional coordinate (1, 0), a panel having a straight line or bent line having a left end at a terminal no. d (see FIG. 8; and in FIG. 10 marked with ★) is connectable to a lower right vertex or terminal no. c of the panel being considered, i.e., a straight-lined panel having a panel index value "2", a bent-lined panel having a panel index value "3" and a bent-lined panel having a panel index value "6".

Meanwhile, if considering an adjacent panel positioned at lower right to the panel being considered, e.g. an adjacent panel having a relative positional coordinate (1, 1), a panel having a straight line or bent line having a left end at a terminal no. a (FIG. 8) is connectable to terminal no. c of the panel being considered, i.e., straight-lined panel having a panel index value "1", a bent-lined panel having a panel index value "3" and a bent-lined panel having a panel index value "4".

Furthermore, if considering an adjacent panel positioned at immediately below the panel being considered, e.g. an adjacent panel having a relative positional coordinate (0, 1), a panel having a straight line or bent line having a left end at a terminal no. b (see FIG. 8) is connectable to a terminal no. c of the panel being considered, i.e. a straight-lined panel having a panel index value "2", a bent-lined panel having a panel index value "4" and a bent-lined panel having a panel index value "5".

That is, in the case that the panel being considered is a straight-lined or bent-lined panel having a left end at a terminal no. c, an adjacent panel connectable to the relevant panel is a panel "2", "3" or "6" to be positioned at an coordinate (1, 0), a panel "1", "3" or "4" to be positioned at a coordinate (1, 1), or a panel "2", "4" or "5" to be positioned at a coordinate (0, 1).

The connectable adjacent panels, as exemplified in FIG. 10, are previously stored as a table form on the basis of a panel index value within a connection panel index table 56 of a ROM 36 shown in FIG. 11. For a straight-lined panel having a panel index value "1", the table 56 stores panel index values for all the adjacent panels connectable to the terminal nos. a and c. For a straight-lined panel having a panel index value "2", the table 56 stores panel index values of all the adjacent panels connectable to terminal nos. b and d. Similarly, for a bent-lined panel having a panel index value "6", the table 56 stores panel index values of all the adjacent panels connectable to the terminal nos. c and d. Incidentally, the number of adjacent panels having a connection terminal connectable to one connection terminal of a certain panel is three in maximum. In connection determination, verification is made on all relevant points of a panel as to a presence or absence of a panel or connectability to such points.

Referring to FIG. 11, the ROM 36 includes a program area 58 and a data area 60. The connection panel index table 56 as explained before is formed in the data area 60.

The program area 58 of FIG. 11 is to store a game program represented by a flowchart as shown in FIG. 13 to FIG. 16, described later. The program area 58 includes an initial set program area 62 storing an initial set program to be executed at a start-up, and an initial set program area 64 storing an initial set program to be executed upon re-playing a game. In an area 66 is stored a program to display a title picture or select a game mode (to be played by one person or played by two persons) or select or control a size of a game field 51 shown in FIG. 2. In an area 68, a panel appearing processing program is stored. This panel appearing processing program controls what panel is to appear in a game field or panel arrangement space 51.

A key input determining program is provided to detect an operation signal given from the operation key of FIG. 1, which is stored on the area 70. A panel movement processing program is stored in a panel movement program area 72, to automatically move (fall in the puzzle game of this embodiment) a panel made to appear by a panel appearing processing program or move (in a left-right direction or only in an X direction in the puzzle game of this embodiment) a panel according to an operation signal determined by the key input determining program.

Figure 15:
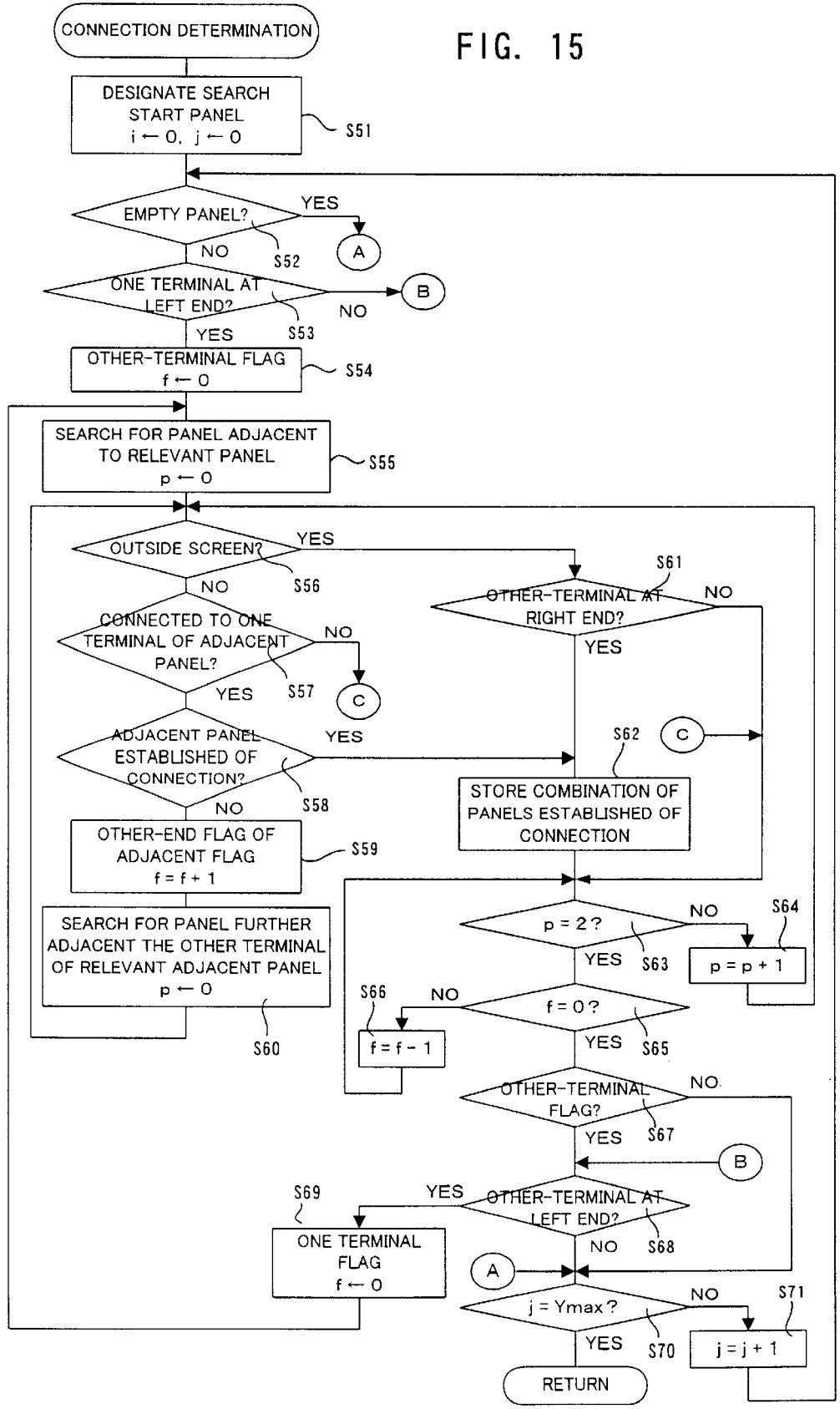
FIG. 15 is a flowchart showing a "connection determination" in the FIG. 14 flowchart.

A connection determining program, mainly shown as a flowchart of FIG. 15, is set up on a connection determining program area 74. A program for erasing or flushing the panels in a complete figure upon finishing a game is set up on a game finish processing program area 76. A score processing program set up on a score processing program area 78 is to execute a score processing as represented in a flowchart of FIG. 16.

The data area 60 includes a terminal no. table 80 previously set up with terminal nos. to provide a connection terminal, for each panel index value of a panel. For example, for straight-lined panel having a panel index value "1", terminal nos. a and c are set up on this table 80. An adjacent panel relative address table 82 is set up with relative positional coordinates for adjacent panels as shown in FIG. 9. It should be noted that the panels positioned on the lowermost row of the game field 51 do not include an adjacent panel having an Y coordinate (1) of FIG. 9. The panels of the uppermost row do not have an adjacent panel having an Y coordinate (−1) of FIG. 9. Similarly, the panels positioned at the extreme left end of the game field 51 do not have an adjacent panel having an X coordinate (−1) of FIG. 9. The panels at the extremely right end do not have an adjacent panel having an X coordinate (1) of FIG. 9. The other panels than those include all the adjacent panels of FIG. 9.

The data area 60 includes a panel image list area 84 which is set up with respective bit map images of the six panels shown in FIG. 4. The bit map image is to be loaded onto an image bit map area 100 shown in FIG. 12, in order to display a panel on the LCD 12 (FIG. 1).

Referring to FIG. 12, an internal RAM or working RAM 26 has field size registers 86 and 88. The registers 86 and 88 are set up with game field 51 sizes in X and Y directions as determined by a size select program set up on the area 66 of FIG. 11. In the FIG. 12 embodiment, the registers 86 and 88 are each set with "5". A game mode flag 90 in the W-RAM 26 is set up with a flag representative of one-person mode or two-person mode, e.g. "0" for one-person mode or "1" for two-person mode.

A score register 92 is provided to store a score acquired by a game player. A connection determining flag 94 is utilized to determine whether on a game field 51 a panel is being connected to an adjacent panel or not. For example, "1" is set for a panel in connection to an adjacent panel while "0" is for a panel out of connection. A completion flag 96 represents whether or not a bent-lined figure (as exemplified in FIG. 5 to FIG. 7) is completed continuing from a left end 52 to a right end 53 (FIG. 2) of a game field 51. An appearing panel data area 98 is set up with a panel index value for a panel to newly appear in timing of display. The bit map images of the panels transferred from the panel image list 84 (FIG. 11) onto the image bit map area 100 are utilized for display.

Figure 13:
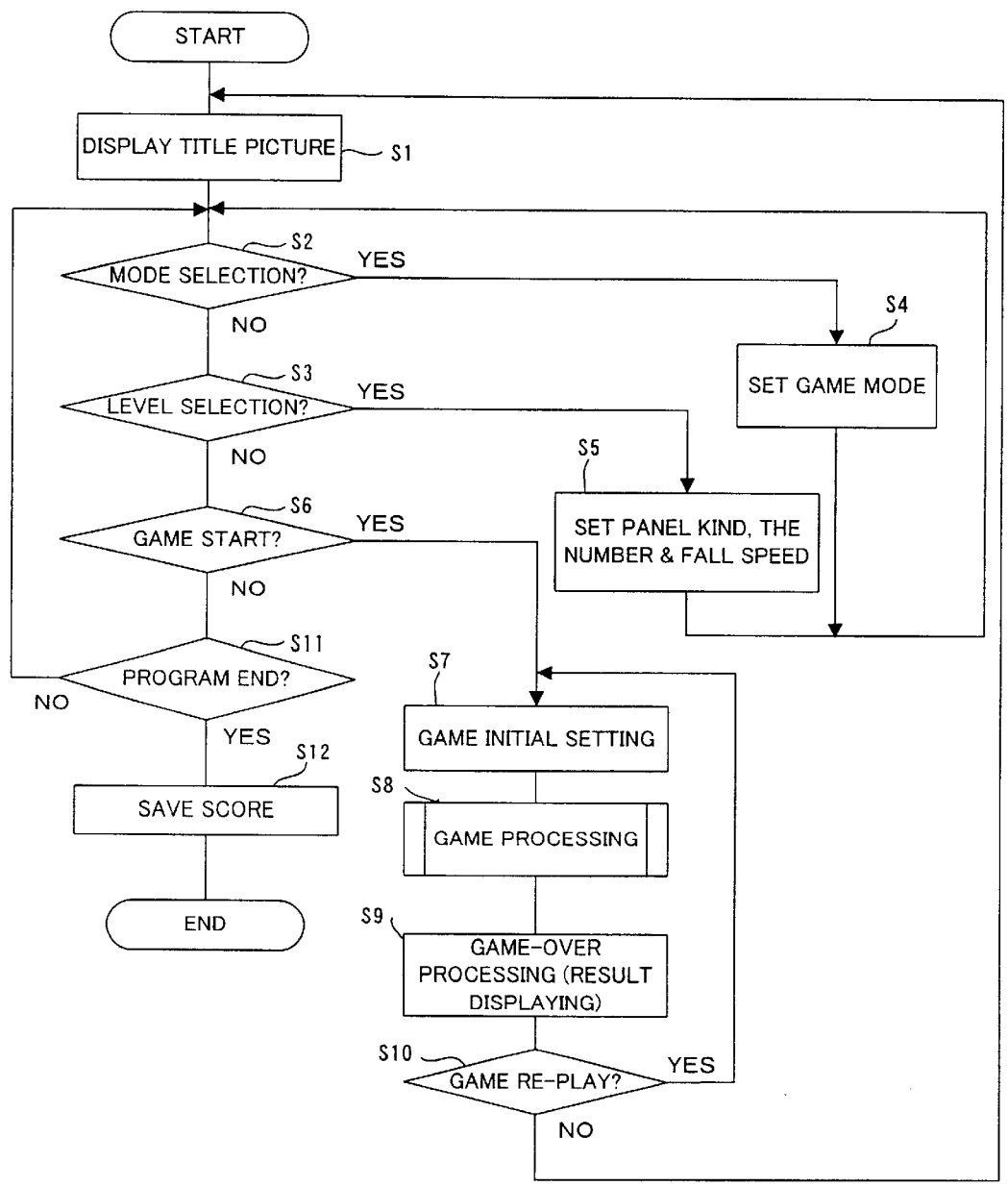
FIG. 13 is a flowchart showing a main routine representing operation of one embodiment.

In the first step S1 of FIG. 13, the CPU 18 (FIG. 1) displays a title picture of a puzzle game on the LCD (FIG. 1) according to a title picture display program set up on the area 66 in FIG. 11. A game player is allowed to select one-person mode or two person mode, and a level of difficulty of a game. In the case that the game player has not designated a mode, one-person mode is selected and the process advances through step S2 to step S3. In the case of setting two-person mode, "YES" is determined in step S2 and the process proceeds to step S4. In step S4 a two-person mode is set and the process returns again to step S2.

After "NO" is determined in step S2, it is determined in step S3 whether or not the game level has been set by the game player. If "YES" is determined in this step S3, then in the succeeding step S5 the CPU 18 sets all or one or a combination of the kinds, the number of and a falling speed of the panels predetermined in accordance with the set game level, according to the game mode/size select program in the area 66 (FIG. 11) of the external ROM 36. The panel kind herein means the kinds of panels of FIG. 4 to be used in the game level. The number of panels means the number of lattices 54 constituting a game field 51 as shown in FIG. 2.

For example, where the level of game difficulty is divided as a low level, a middle level and a high level, the kinds of panels to be used are given as two, four and six in kind. When selecting the low level, two kinds of straight-lined panels having panel index values "1" and "2" are only used. If a middle level is selected, two kinds of bent-lined panels respectively having panel index values "3" and "4" are used in addition to the two kinds of panels. For a high level, additionally used are two kinds of bent-lined panels respectively having panel index values "5" and "6". Where the game difficulty level is divided as a low level, a medium level and a high level, the number of panels used, i.e. the size of a game field 51, are respectively set as 4×4, 5×5 and 6×6. Similarly, the falling speed is set faster as the game level becomes higher.

The bit map image of the kind of a panel set in step S5 is read onto the image bit map area 100 of the RAM 26 shown in FIG. 12. Also, the field size set in step S5 is set in the field size registers 86 and 88 of the RAM 26. Similarly, the panel fall speed is also set in a not-shown register.

Advancing from step S5 to step S6 through steps S2 and S3, it is determined in the step S6 whether the start button 40c (FIG. 1) was operated or not. If "YES" is determined in step S6, the process proceeds to step S7 where the CPU 18 makes initial setting on the registers and counters.

Subsequently, in step S8 a game processing is executed. The game processing will be explained in greater detail later with reference to FIG. 14. After ending the game processing of step S8, the CPU 18 in step S9 executes a game-over process according to a game finish processing program set up on the area 76 of the program ROM 36. It can be considered, as a game-over processing, various processing, including displaying a game result. After step S9, unless game re-play is instructed in step S10, the process returns to step S1. If a game re-play is instructed, the process returns to step S7.

In the case that game re-play is not instructed in step S10 and further the start key 40c is not pressed in step S6, "NO" is determined in step S6 and the process proceeds to step S11. It is determined in step S11 whether or not the game player has instructed to finish the game, for example, by pressing the button A 40e, responsive to a comment "GAME FINISH?" displayed on the LCD 12. If not to finish the game, the process returns to step S2.

If to finish the game, a score is entered in a score register 92 of the RAM 26 according to a score processing program set up on the score processing program area 78 of the program area 58. The score in the score register 92 is then saved in the back-up RAM 34 (FIG. 1). This score saving process is to enable the display of a past score (high score) on a later date.

Figure 14:
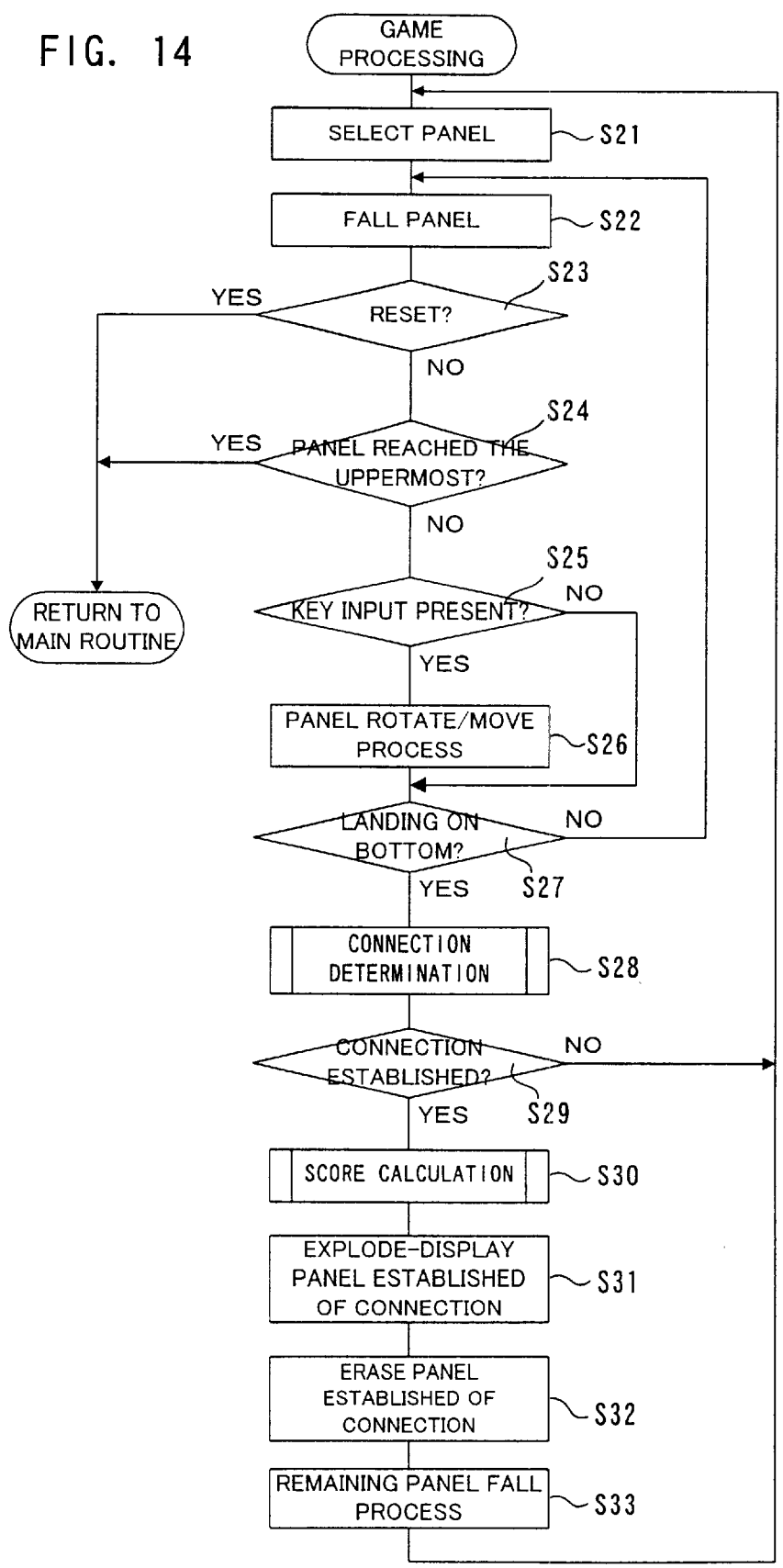
FIG. 14 is a flowchart showing a "game processing" subroutine in the FIG. 13 flowchart.

FIG. 14 illustrates concretely. the game processing routine of the FIG. 13 flowchart. In the first step S21 of FIG. 14, the CPU 18 selects panels. That is, determination is made for panels (FIG. 4) to appear into a game field 51. In the succeeding step S22, the CPU 18 causes to fall a panel appearing on an uppermost column of any row of a game field 51 as in FIG. 2, according to a panel move processing program shown in the area 72 of FIG. 11 and a fall speed as set in the step S5 (FIG. 13).

If thereafter reset is made (step S23) or the panels reach an uppermost row (step S24), it is considered as game over and the process returns to step S9 of FIG. 13.

If "NO" is determined in both steps S23 and S24, the CPU 18 in the next step S25 determines whether or not a key input signal was inputted through the operation key 40, i.e. 40a–40e. The presence of any key input signal during pad falling signifies that the game player has instructed to rotate and/or move a panel. Consequently, the CPU 18 rotates and/or moves the panel according to a panel rotate/move program on the area 72 of FIG. 11. Because the present embodiment adopts a fall scheme that a panel falls from above, the panel is allowed to move only in left- and-right directions. In the case of an ascending scheme, however, the panel is movable in every direction of up, down, left and right. The rotation of panel is to be achieved by manipulating, for example, a button A 40e or button B 40d.

In the next step S27 the CPU 18 determines whether or not the panel that started falling in step S22 has reached a "bottom" of the game field 51. The "bottom" herein signifies either of the lowermost row of the game field 51 or on a panel appeared and fallen earlier in time. Accordingly, in this step S27 "YES" is determined at a time that the panel now falling reaches a lowermost low or comes to rest on an earlier panel.

If "YES" is determined in step S27, the CPU 18 in the succeeding step S28 executes a "connection determination". This connection determination will be described later with reference to FIG. 15.

In the case that it is determined in step S29 that there is an establishment of connection as a result of connection determination, it is then determined whether or not a bent-lined figure is completed continuing from the left end 52 to right end 53 (FIG. 2) of the game field or panel arrangement space 51. If "NO" is determined in step S29, the process returns to the first step S21, whereas if "YES" is determined, a "score calculation" is executed in the next step S30.

Figure 16:
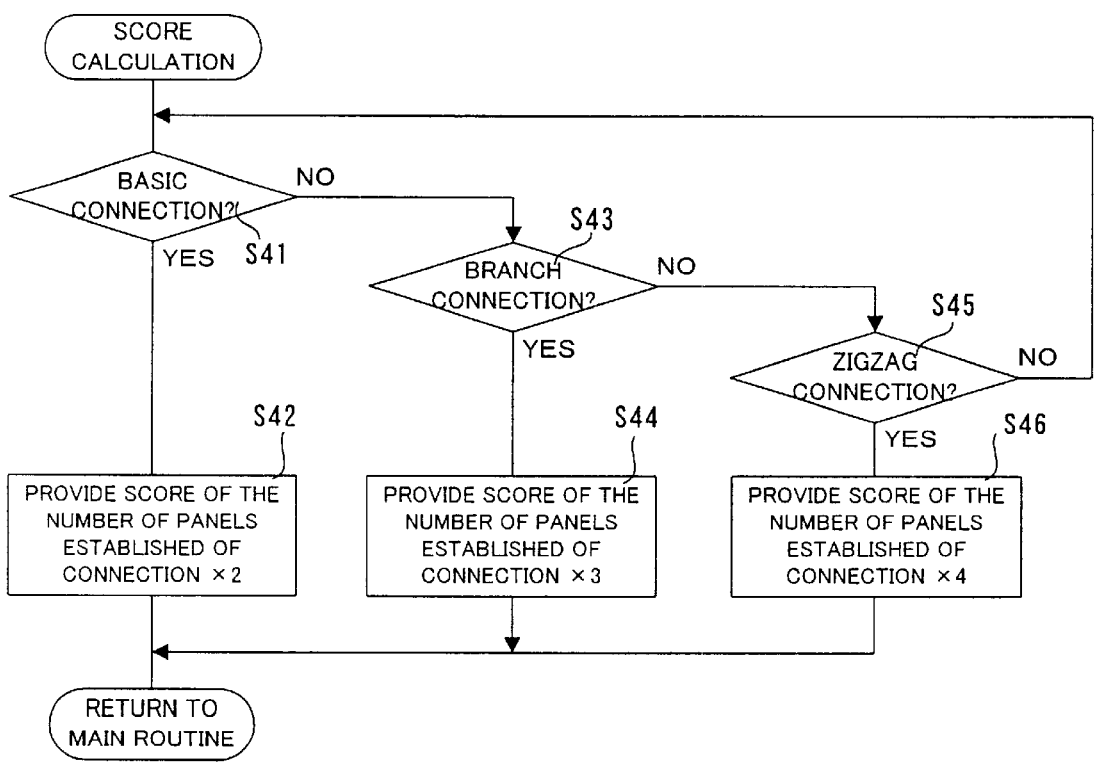
FIG. 16 is a flowchart showing a "score calculation" subroutine in the FIG. 14 flowchart.

FIG. 16 shows a score calculating subroutine. In FIG. 16, it is determined in steps S41, S43 and S45 which one of a basic connection (FIG. 5), branch connection (FIG. 6) or zigzag connection (FIG. 7) the established connection has fallen under, based upon a connection form stored in step S62 of FIG. 15 described later. For a basic connection, in step S42 a score is given of the number on panels achieving the basic connection (to be known by step S62 of FIG. 15)×2. For a branch connection, in step S44 a score is given for the number of panels achieving the branch connection×3. For a zigzag connection, in step S46 a score is given for the number of panels achieving the zigzag connection×4. That is, in the puzzle game of this embodiment, a higher score is obtainable by completing a complicated bent-lined figure continuing from a left end to right end of the game field 51.

Figure 17:
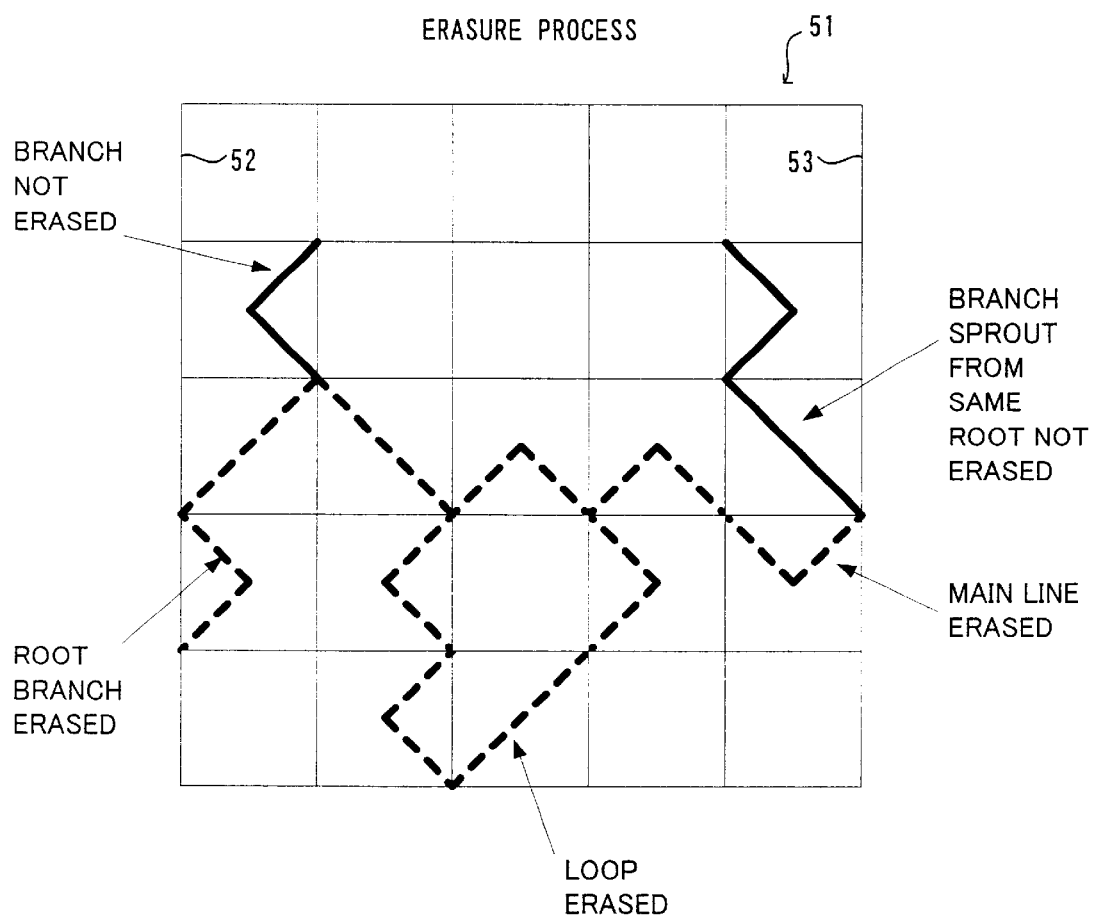
FIG. 17 is an illustrative view showing an "erasure processing" when establishing a connection.

Returning from FIG. 16 to step S31 of FIG. 14, in this step S31 the panel establishing the connection is exploded (flashed) in display, and in step S32 the panel establishing the connection is erased as shown in FIG. 17. In FIG. 17, the dotted-lined panels represent those to be erased whereas the solid-lined panels show those not to be erased. The connection form of FIG. 17 is a branch connection wherein the above is true for the panels forming a bent-lined figure continuing from the left end 52 to right end 53 in the panel arrangement space 51, as shown in the dotted lines. That is, the respective panels in absolute coordinate positions X0, Y2 and X0, Y3 are erased because these have a connection terminal contacting the left end 52 of the game field 51 and connected with a connection terminal of an adjacent panel connected to each of their connection terminal. However, the panel in an absolute coordinate position X0, Y1 having no connection terminal connected to the left end 52 is not erased. Meanwhile, the panel in an absolute coordinate position X4, Y1 is not erased because of having no connection terminal contacting the right end 53. The panel in an absolute coordinate position X4, Y2, having a connection terminal contacting the right end 53 but not involved in establishment of connection, is not erased. On the other hand, the panel in an absolute coordinate position X4, Y3 has a connection terminal contacting the right end 53 and an adjacent panel connected to the same connection terminal, and is erased. The panel having an absolute coordinate position X1, Y2, the panel having an absolute coordinate position X1, Y3, the panel having an absolute coordinate position X1, Y4, the panel having an absolute coordinate position X2, Y2, the panel having an absolute coordinate position X2, Y4, panel having an absolute coordinate position X3, Y2 and the panel having an absolute coordinate position X3, Y3 are all erased because they are connected at their own connection terminal to a connection terminal of an adjacent panel.

If the panels in establishment of connection are erased in this manner, the panel having an absolute coordinate position X0, Y1, panel having an absolute coordinate position X4, Y1 and panel having an absolute coordinate position X4, Y2 are left from the erasure, when considered in the FIG. 17 embodiment. In step S33, these left panels are fallen down to a "bottom". The left panels in this fall process will enter a lattice 54 of the game field 51 that is not filled with a panel.

Referring finally to FIG. 15, explanation will be made on the operation of connection determination. A connection determining routine uses absolute coordinates Xi, Yi as were given to the lattices 54 in the game field 51 of FIG. 2, in order to specify an objective panel. In the first step S51, a panel X0, Y0 positioned at the upper left in the game field 51 is set as a connection search start panel.

Next, it is determined in step S52 whether the absolute coordinate X0, Y0 panel set as an objective panel in step S51 is an empty panel or not. If it is an empty panel, the process advances to hereafter-mentioned step S70. However, if not an empty panel, it is determined in the next step S53 whether the objective panel X0, Y0 at its one connection terminal is connected to the left end 52 of the game field 51 or not. If the one connection terminal is out of contact to the left end 52, the process advances to hereafter-mentioned step S68. However, if "YES" is determined in this step S53, the CPU 18 in the next step S54 resets a flag F (formed in the work RAM 26) for the other connection terminal of the objective panel.

In step S55, the CPU 18 renders the number of adjacent panel p as "0", and searches for a panel to be adjacent to the other connection terminal by utilizing an adjacent panel relative address table 82 of FIG 11. It is determined in step S56 whether an adjacent panel is at an outside of the game, field 51 or not. When a panel to be adjacent to the other connection terminal is at an outside of the game field 51, "YES" is determined in this step S56 and the process proceeds to step S61 (described later). In other cases than that, i.e. where a panel to be adjacent to the other connection terminal is within the game filed 51, "NO" is determined in step S56.

If "NO" is determined in step S56, the CPU 18 in the succeeding step S57 determines whether the panel being considered is connected to one connection terminal of the adjacent panel or not by utilizing the connection panel index table 56 (FIG. 11). At the same time, in step S58 the CPU 18 determines whether the adjacent panel for which "YES" have been determined in step S57 is established of connection or not, i.e. whether it is a panel already stored in the below-mentioned step S62 or not. Incidentally, "NO" is determined in step S57, the process advances to step S63, described later.

If "NO" is determined in step S58, i.e. if the panel being considered is connected at the other connection terminal to one connection terminal of the adjacent panel and the relevant adjacent panel is not established of connection, then in step S59 the CPU 18 sets the other connection terminal flag f for an adjacent panel to "f+1". Then, in step S60 the number of adjacent panels is rendered p=0 and a panel is searched for which is to be adjacent to the other connection terminal of the adjacent panel. Then, the process returns to step S56.

In this manner, where in steps S56 to S60 a first panel being considered positioned in an absolute coordinate X0, Y0 is not an empty panel and one connection terminal of the same panel is connected to the left end 52, an adjacent panel is searched for in order which has a connection terminal to be connected to the other connection terminal of the panel being considered.

Incidentally, where "YES" is determined in step S58, the panel being considered is to be connected to the panel established of connection thus resulting in establishment of connection, and the process proceeds to step S62, described later.

When "YES" is determined in the former step S56, i.e. where the panel adjacent the other connection terminal of the panel being considered is located at an outside of the game field 51, then in step S61 the CPU 18 determines whether the other connection terminal contacts the right end 53 of the game field 51 or not. If "YES" is determined in this step S61, this fact signifies a completion of a bent-lined figure including the panel being considered, i.e. establishment of connection. The CPU 18 in the succeeding step S62 stores a combination of panels at that time in the form of absolute coordinates Xi, Yj of lattices 54 of FIG. 2, into the working memory 26 (FIG. 1). Consequently, the determination of the former step S58 is made possible. Further, it is possible to know the number of panels having i=0 in coordinate Xi, and the number of panels having i=max ("4" in this embodiment). It is therefore possible to determine a connection form (basic connection, branch connection and zigzag connection) according to the score calculating routine of FIG. 16 as was explained before.

Thereafter, the process proceeds to step S63. Incidentally, where "NO" is determined in step S61, connection is not established and the process advances to step S63 similarly to the case "NO" was determined in step S57.

In step S63, the CPU 18 determines whether the number of adjacent panels p is "2" or not, i.e. whether or not three adjacent panels have all been checked which adjacent the other connection terminal of the panel being considered. If "NO" is determined in this step S63, then in step S64 the number of adjacent panel p is incremented to (p+1) and the process returns to step S56.

After "YES" is determined in step S63, the CPU 18 in the next step S65 determines whether the other terminal flag f is "0" or not, i.e. whether or not all the panels have been searched for which are to be connected to the panel being considered having been set in step S51 or S71. If not so, then in step S66 the flag f is decremented to (f−1) and the process returns to S63.

If "YES" is determined in step S65, then in step S67 the CPU 18 determines whether the flag f in step S65 is an other connection terminal flag for the panel being considered or not. If "YES", it is determined in step S68 whether the other connection terminal contacts the left end 52 of the game field 51 or not. Incidentally, this step S68 is executed when "NO" is determined in the former step S53. If "YES" is determined in this step S68, then in step S69 the one connection terminal flag f is reset and the process returns to the former step S55.

The process advances to step S70 when "YES" is determined in step S52, when "NO" is determined (i.e. the flag f is for one connection terminal) in step S67, or when "NO" is determined in step S68, i.e. when all the panels to be connected to the panel being considered have been searched. In step S70 the CPU 18 determines whether the Y coordinate value j is at a maximum value ("4" in this case) or not. That is, determination is made on whether connection establishment has been checked for on all the panels at the left end in the game field 51 or not. If "YES", the process returns to the game processing routine (FIG. 14) whereas if "NO", in step S71 the Y coordinate value j is incremented to (j+1) and the process returns to step S52.

In the connection determining subroutine, when there is a panel having a connection terminal contacting the left end 52 of the game field 51 of FIG. 2, it is determined whether or not connection is established, i.e. whether a bent-lined figure is completed continuing from the left end 52 to right end 53. In the case of not established of connection, a score is entered according to the number of panels involved in connection and according to FIG. 16.

The above embodiment adopted a fall scheme that a new slant-lined panel is thrown, by falling, into the game field. Alternatively, an ascending scheme may be adopted wherein a new panel is thrown, by soaring, into the game field.

Meanwhile, although it was explained that the puzzle game according to the invention is to be realized on the portable game machine shown in FIG. 1, the kind of game machine is not limited to this, i.e. it is possible to apply a usual to computer or so-called a video game machine wherein game play is possible by connecting to a television monitor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A puzzle game apparatus, comprising:
    an operating member to be operated by a game player;
    a display for displaying a game field having a plurality of lattices arranged in a matrix form and having a first end and a second end;
    a panel thrower for throwing a panel depicted with a line connecting at least between two connection terminals into a game field displayed on said display, wherein the connection terminals are defined by corners of the panel said panel has a quadrilateral shape having four vertexes, said connection terminals being formed at two of said four vertexes, and said line being a line connecting between said two vertexes and a center of said quadrilateral shape;
    a panel shifter for causing a panel thrown in said game field to shift on said display according to operation of said operating member; and
    a connection determiner for detecting whether or not a bent-lined figure continuing from the first end to the second end of said game field is formed by panels including said thrown panel.

2. A puzzle game apparatus according to claim 1, wherein said panel includes one of a straight lined panel having said straight line given as a diagonal line of said square and a bent-lined panel having said straight line given as a bent line connecting between adjacent two vertexes and said center.

3. A puzzle game apparatus according to claim 1 further comprising a success display to represent a success when on display when said bent lined figure is detected by said connection determiner.

4. A puzzle game apparatus according to claim 3, wherein said success display includes a panel eraser for erasing a panel involved in completing said bent lined figure.

5. A puzzle game apparatus according to claim 1, wherein said panel shifter includes at least one panel rotater to rotate said panel in response to operation of said operating member and a panel mover for moving said panel in response to operation of said operating member.

6. A puzzle game apparatus according to claim 5, wherein said connection determiner includes an adjacent panel detector for detecting whether or not there is an adjacent panel being adjacent to each panel displayed on said display, a connection detector for detecting whether or not said adjacent panels at connection terminals thereof are connected with each other, and a succession detector for detecting whether or not two or more adjacent panels are connected in a successive form.

7. A puzzle game apparatus according to claim 1, further comprising a scorer for entering a score when said bent lined figure is detected by said connection determiner.

8. A puzzle game apparatus according to claim 7, wherein said bent lined figure has a plurality of connection patterns different from each other, and said scorer enters a different score for a different connection pattern.

9. A puzzle game apparatus according to claim 8, wherein said plurality of connection patterns include a basic connection pattern, a branch connection pattern and a zigzag connection pattern.

10. A storage medium for a puzzle game apparatus, comprising:
    a first generator for generating game field data to display on a display a game field having a plurality of lattices arranged in matrix;
    a second generator for generating panel data to display a panel depicted with a line connecting at least between two connection terminals said panel has a quadrilateral shape having four vertexes, said connection terminals being formed at two of said four vertexes, and said line being a line connecting between said two vertexes and a center of said quadrilateral shape;
    a throw program for throwing into said game field a panel of panel data generated by said second generator;
    a panel shift program for shifting a panel thrown into said game field; and
    a connection determining program for determining whether or not a bent lined figure is formed continuing from one end to the other end of said game field on said display.

11. A storage medium according to claim 10, further comprising a score program for entering a score when said bent line figure is formed.

12. A puzzle game apparatus, comprising:
    an operating member to be operated by a game player;
    a display for displaying a game field having a plurality of lattices arranged in a matrix form and having a first end and a second end;
    panel thrower for throwing a panel depicted with a line connecting at least between two connection terminals into a game field displayed on said display said panel has a quadrilateral shape having four vertexes, said connection terminals being formed at two of said four vertexes, and said line being a line connecting between said two vertexes and a center of said quadrilateral shape;
    a panel shifter for causing a panel thrown in said game field to shift on said display according to operation of said operating member;
    a connection determiner for detecting whether or not a bent-lined figure continuing from the first end to the second end of said game field is formed by panels including said thrown panel; and
    a scorer for entering a score when said bent-lined figure is detected by the connection determiner, wherein the bent-lined figure has a plurality of different possible connection patterns, and said scorer enters a different score for each of the different connection patterns.

13. A puzzle game apparatus, comprising:

an operating member to be operated by a game player;

a display for displaying a game field having a plurality of lattices arranged in a matrix form and having a first end and a second end;

a panel thrower for throwing a rectangular panel depicted with a line connecting at least between two connection terminals into a game field displayed on said display, wherein the connection terminals are defined by corners of the rectangular panel said rectangular panel has a quadrilateral shape having four vertexes, said connection terminals being formed at two of said four vertexes, and said line being a line connecting between said two vertexes and a center of said quadrilateral shape;

a panel shifter for causing a panel thrown in said game field to shift on said display according to operation of said operating member;

a connection determiner for detecting whether or not a bent-lined figure continuing from the first end to the second end of said game field is formed by panels including said thrown panel; and a scorer for entering a score when said bent-lined figure is detected by the connection determiner, wherein the bent-lined figure has a plurality of different possible connection patterns, and said scorer enters a different score for each of the different connection patterns.

* * * * *